(12) United States Patent
Villhauer et al.

(10) Patent No.: US 8,941,338 B2
(45) Date of Patent: Jan. 27, 2015

(54) REDUNDANT BRAKING SYSTEM WITH CONSTANT BRAKING TORQUE AND PRINTING PRESS HAVING THE BRAKING SYSTEM

(75) Inventors: Reiner Villhauer, Waghaeusel (DE); Klaus-Dieter Kleibaumhueter, Bad Schoenborn (DE); Josef Reiter, Eppelheim (DE); Andreas Schulz, Heidelberg (DE)

(73) Assignee: Heidlelberger Druckmaschinen AG, Heidelberg (DE)

( * ) Notice: Subject to any disclaimer, the term of this patent is extended or adjusted under 35 U.S.C. 154(b) by 193 days.

(21) Appl. No.: 13/315,870

(22) Filed: Dec. 9, 2011

(65) Prior Publication Data

US 2012/0146558 A1 Jun. 14, 2012

(30) Foreign Application Priority Data

Dec. 10, 2010 (DE) .......................... 10 2010 054 012

(51) Int. Cl.
*H02K 7/10* (2006.01)
*H02P 3/18* (2006.01)
(Continued)

(52) U.S. Cl.
CPC . *H02P 3/18* (2013.01); *B41F 33/12* (2013.01); *H02P 3/14* (2013.01); *H02P 3/22* (2013.01)
USPC ............... 318/362; 318/612; 318/63; 318/86; 318/375; 318/432; 187/288

(58) Field of Classification Search
USPC ............. 318/612, 56, 57, 139, 376, 759, 762, 318/60, 63, 86, 87, 88, 400.09, 703, 7, 741, 318/742, 757, 760, 258, 261, 269, 273, 362, 318/370, 371, 372, 3, 75, 758; 361/90, 56, 361/18, 91.7, 86, 30, 111; 363/55; 187/288; 323/265; 303/112, 15.2, 122, 152, 20; 188/158, 162, 71.9, 72.1, 72.8
See application file for complete search history.

(56) References Cited

U.S. PATENT DOCUMENTS 3,525,027 A * 8/1970 Weiser .......................... 318/367
3,991,352 A * 11/1976 Fry et al. ....................... 318/759
(Continued)

FOREIGN PATENT DOCUMENTS

| DE | 10 2007 058 098 A1 | 6/2008 |
| JP | 61022704 A * | 1/1986 |
| JP | 11206184 A | 7/1999 |

OTHER PUBLICATIONS

German Patent and Trademark Office Search Report, Dated Aug. 4, 2011.

*Primary Examiner* — Eduardo Colon Santana
*Assistant Examiner* — Jorge L Carrasquillo
(74) *Attorney, Agent, or Firm* — Laurence A. Greenberg; Werner H. Stemer; Ralph E. Locher

(57) ABSTRACT

An electric braking device for printing material processing machines includes at least one electric drive to be braked that is supplied by a power converter in motor operation and is braked by the power converter in generator operation. A control unit switches on a redundant electric braking device in the case of a failure of the power converter by using a switch. The braking device has at least two braking stages, an additional switch for actuation in at least two stages, and at least one brake resistor. In the circuit of the redundant electric braking device, a braking current is measured and the measured value is fed to a comparator for comparing the actual braking current to a desired braking current. A printing press having the braking device is also provided.

8 Claims, 1 Drawing Sheet

(51) Int. Cl.
*B41F 33/12* (2006.01)
*H02P 3/14* (2006.01)
*H02P 3/22* (2006.01)

(56) References Cited

U.S. PATENT DOCUMENTS

| | | | |
|---|---|---|---|
| 4,405,886 A * | 9/1983 | Williamson | 318/376 |
| 4,431,956 A * | 2/1984 | Angquist | 318/759 |
| 4,468,599 A * | 8/1984 | Berman et al. | 318/362 |
| 5,038,244 A * | 8/1991 | Tuusa | 361/56 |
| 5,070,290 A * | 12/1991 | Iwasa et al. | 318/758 |
| 6,577,483 B1 * | 6/2003 | Steicher et al. | 361/90 |
| 6,653,806 B1 | 11/2003 | Ono | |
| 7,287,473 B2 | 10/2007 | Kleibaumhueter et al. | |
| 7,781,997 B2 * | 8/2010 | Kallioniemi et al. | 318/379 |
| 8,026,681 B2 | 9/2011 | Alexander et al. | |
| 2004/0227479 A1 | 11/2004 | Youm | |
| 2008/0150459 A1 * | 6/2008 | Alexander et al. | 318/376 |
| 2009/0224706 A1 * | 9/2009 | Jobard | 318/380 |
| 2011/0057588 A1 * | 3/2011 | Rineh et al. | 318/380 |

* cited by examiner

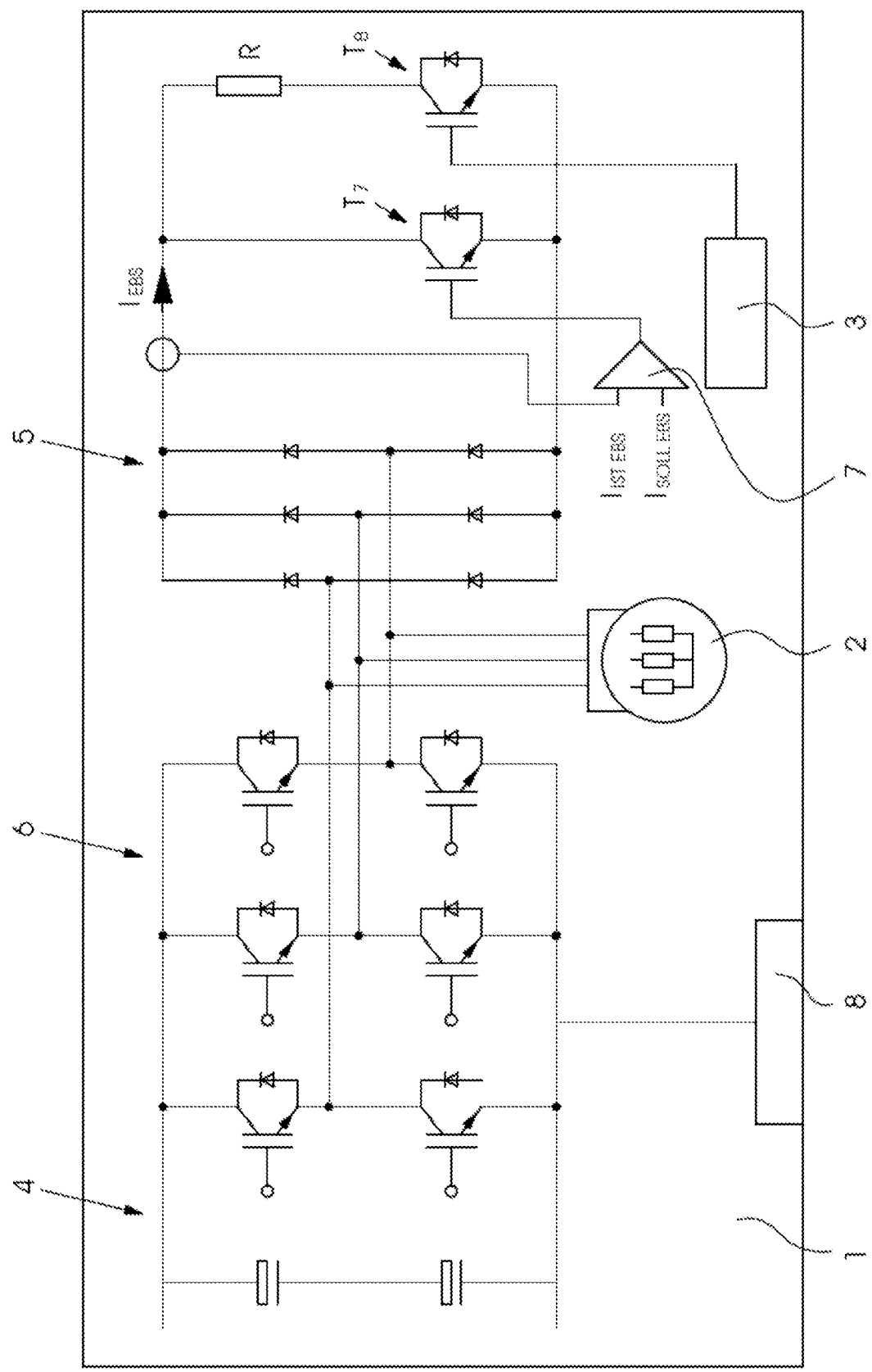

REDUNDANT BRAKING SYSTEM WITH CONSTANT BRAKING TORQUE AND PRINTING PRESS HAVING THE BRAKING SYSTEM

CROSS-REFERENCE TO RELATED APPLICATION

This application claims the priority, under 35 U.S.C. §119, of German Patent Application DE 10 2010 054 012.9, filed Dec. 10, 2010; the prior application is herewith incorporated by reference in its entirety.

BACKGROUND OF THE INVENTION

Field of the Invention

The present invention relates to an electric braking device including at least one electric drive which is to be braked and is supplied by a power converter in motor operation and is braked by the power converter in generator operation. The invention also relates to a printing press having the braking system.

Such devices for braking drive motors in printing presses are known, in principle, from German Published Patent Application DE 10 2007 058 098 A1, corresponding to U.S. Pat. No. 8,026,681. In motor operation, a drive motor of the printing press, for instance the main drive motor, may be driven at a controlled speed and angle of rotation using the power converter, which is bidirectional. In generator operation, the drive motor may be used to brake the cylinders that are driven by the main drive. Another advantage of the provision of a generator mode of operation is that the main drive and the cylinders connected by a gear train in the printing press can be braked electrically by actuating the power converter. Thus, no mechanical brake needs to be provided to bring the printing press to a standstill as quickly as possible for safety reasons in an emergency, for instance when a cover is opened. However, if the power converter or its control fails, the drive of the printing press can no longer be braked electrically. Consequently, a second braking device needs to be provided for reasons of safety. In order to be able to avoid the use of a mechanical brake, which is subject to wear, German Published Patent Application DE 10 2007 058 098 A1, corresponding to U.S. Pat. No. 8,026,681, discloses braking the drive motor using an additional electric braking device in the case of a failure of the power converter. For that purpose, a further switchable braking device that receives electric energy is provided to ensure safe braking if the power converter fails. That additional switchable electric braking device includes a rectifier and at least one brake resistor and a transistor for switching the brake resistor. In addition, an electric braking device is disclosed that includes multiple switches and brake resistors that are switched on in steps. A disadvantage of that device is that the braking operation is not smooth and occurs in jolts.

SUMMARY OF THE INVENTION

It is accordingly an object of the invention to provide a redundant braking system with constant braking torque and a printing press having the braking system, which overcome the hereinafore-mentioned disadvantages of the heretofore-known systems and printing presses of this general type and which provide an electric braking device for machinery for processing printing material which provides a smooth braking operation when electric braking using a power converter of a drive motor is not possible.

With the foregoing and other objects in view there is provided, in accordance with the invention, an electric braking device for machines. The braking device comprises a power converter, at least one electric drive to be braked, the at least one electric drive being supplied by the power converter in motor operation and braked by the power converter in generator operation, and a redundant electric braking device having at least two braking stages and a circuit including a first switch, a second switch being actuated in at least two stages, at least one brake resistor, a comparator receiving a measured actual braking current and comparing the measured actual braking current to a desired braking current, and a control unit using the first switch for switching on the redundant electric braking device upon a failure of the power converter.

With the objects of the invention in view, there is also provided a printing press, comprising a braking device according to the invention.

The present invention is particularly suited for use in machines for processing printing material such as printing presses, folders, diecutting machines, etc., which include drive motors that are supplied by power converters and need to be safely braked in the case of an emergency stop or a failure of the power converter. In accordance with the invention, in order to ensure safe braking in the case of a failure of the power converter and an unavailability of the generator braking mode of the drive motor, an additional electric braking device is provided which is switched on by a control device in the case of a failure of the power converter using a switch such as a transistor. This control device is independent of the control of the power converter to ensure that a failure of the control of the power converter does not cause the redundant electric braking device to fail as well. The control device for the redundant electric braking device may be integrated in the control unit of the printing press. In addition, a second switch is provided to switch the electric braking device. The electric energy in the redundant braking device is dissipated in a brake resistor. Additionally, the braking current in the redundant electric braking device is continuously measured and the measured value is fed to a comparing element that compares the actual current to a desired braking current. This comparing element determines deviations between the desired braking current and the actual braking current to control the respective switches and transistors of the redundant braking device in a corresponding manner to get the actual braking current to follow the desired braking current in an ideal way. The definition of a linear desired braking current and the phasing in of the transistors of the redundant electric braking device to attain the ideal braking current causes the braking process to be as free from jolts as possible.

In accordance with another feature of the invention, the switches are preferably IGBT transistors. The control of the second switch advantageously maintains the braking torque at a constant level over the rotational speed of the drive motor. The braking power decreases in a linear way as the rotational speed of the drive motor decreases.

In accordance with a further feature of the invention, at least the second switch is controlled in a pulse-width modulated manner. Due to the modification of the frequency for the pulse-width modulation (PWM), the braking torque and the braking power can be set with great precision to ensure that the braking power decreases linearly with the rotational speed. By appropriately selecting the frequency of the pulse-width modulation, the braking torque can be maintained on a constant level over the rotational speed of the drive motor.

In accordance with an added, advantageous feature of the invention, the power components of the power converter are switched off in the case of a failure of the drive control of the drive of the machine for processing printing material. This may be achieved by interrupting the power supply of the control of the power converter so that a defective control of the power converter does not cause the power converter to enter into an uncontrolled state and to hinder the braking operating. If a defect occurs in the control of the power converter, the control is switched off for reasons of safety.

In accordance with a concomitant embodiment of the invention, the redundant braking device is switched on by the control when an emergency stop is initiated for the machine for processing printing material. On one hand, it is possible to always brake the printing press through the use of the redundant electric braking device whenever the drive control for controlling the power converter fails. On the other hand, the braking device may be set up in such a way that the braking operation is not initiated immediately upon a failure of the drive control but only when an emergency stop signal is triggered. Such an emergency stop signal is triggered when the printing press enters into a state that may be hazardous to the operators, for example when an operator opens a guard on the printing press. The opening of the guard triggers the emergency stop signal, which in turn triggers the redundant braking device by way of the control of the redundant braking device to ensure a controlled and fast braking of the printing press when the drive control fails.

Thus, the present invention enhances the safety of the printing press and ensures a constant, fast braking of the drive motor of the printing press in the case of a failure of the power converter that supplies the drive motor. In contrast, in the conventional known braking device, the braking power decreases quadratically with the rotational speed, thus causing the braking operation to take much longer.

Other features which are considered as characteristic for the invention are set forth in the appended claims.

Although the invention is illustrated and described herein as embodied in a redundant braking system with constant braking torque and a printing press having the braking system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a schematic and block circuit diagram of a printing press having a redundant braking system according to the invention.

DETAILED DESCRIPTION OF THE INVENTION

Referring now in detail to the single FIGURE of the drawing, there is seen a redundant electric braking device 5 of the invention which is used in a printing press 1 that includes at least one main drive motor 2. The main drive motor 2 is provided to drive printing cylinders and transport cylinders, etc. in printing units of the printing press 1 through a gear train. The main drive motor is controlled through a power element 6 including six transistors for controlling the rotational speed and position of the main drive motor 2. The power element 6 of the main drive motor 2 is connected to a direct current voltage intermediate circuit 4, which in turn is connected to the mains using a non-illustrated mains adapter. The transistors of the power element 6 are controlled by a drive control 8. This drive control 8 converts rotational speed settings and angular positions of the control unit of the printing press 1 into control commands for controlling the six transistors. The power element 6 is capable of operating in a motor mode and in a generator mode. In the motor mode, the power element 6 supplies power to the main drive motor 2. In the generator mode, the main drive motor 2 is braked and power is fed back into the direct current voltage intermediate circuit 4 through the power element 6. Thus, the main drive motor 2 can be braked through the use of the generator mode. However, when a failure occurs in the power element 6 or when the drive control 8 breaks down, the braking of the main drive motor 2 by generator operation is no longer possible.

The redundant electric braking system 5 is provided for that case. The redundant electric braking system 5 includes two transistors $T_7$, $T_8$. In order to phase in the redundant electric braking system 5, the braking transistor $T_8$ is switched on to conduct current to a brake resistor R. The electric energy of the main drive motor 2 is thus converted into heat in the brake resistor R and consequently the main drive motor 2 is braked. Moreover, the additional transistor $T_7$ is provided for controlling a braking current $I_{EBS}$ in the redundant electric braking system 5. For this purpose, an actual braking current $I_{IST\ EBS}$ in the redundant electric braking system 5 is determined, and the determined value is fed to a comparator 7 to be compared to a predetermined desired braking current $I_{SOLL\ EBS}$. If there is a difference between the actual braking current $I_{IST\ EBS}$ and the desired braking current $I_{SOLL\ EBS}$, the additional transistor $T_7$ is actuated in a suitable way to adapt the actual braking current $I_{IST\ EBS}$ to the desired braking current $I_{SOLL\ EBS}$. For this purpose, the additional transistor $T_7$ is actuated by a control 3 of the redundant braking system in a pulse-width modulated way. This PWM actuation of the additional transistor $T_7$ provides a way of maintaining the braking torque on an approximately constant level over the rotational speed of the motor. This is done to ensure that the braking power decreases linearly with the rotational speed.

Basically, the redundant electric braking system 5 operates as follows: In the case of a failure of the power element 6 or the drive control 8, the transistors of the power element 6 are switched off and the main drive motor 2 of the printing press becomes out of control. When an emergency stop is initiated during this out-of-control phase, for instance if an operator opens a guard, the machine control activates the redundant braking system 5. This means that the control 3 of the redundant braking system 5 is switched on once through the use of the braking transistor $T_8$ to cause the energy to be converted to heat in the brake resistor R. In addition, the additional transistor $T_7$ is activated and the control time and control frequency of the additional transistor $T_7$ are controlled by the control 3 of the redundant braking system in such a way that the actual braking current $I_{IST\ EBS}$ corresponds as closely as possible to the desired braking current $I_{SOLL\ EBS}$. This circuit configuration and actuation rely on boost conversion or step-up conversion to ensure that a high initial voltage is generated at the brake resistor R even at a low input voltage corresponding to low power operation of the electric motor if the main drive motor 2 operates at a low speed and thus to provide an efficient braking operation. Since the additional transistor $T_7$ is controlled by using pulse-width modulation, the braking operation is linear over the rotational speed.

The invention claimed is:

1. An electric braking device for machines, the braking device comprising:
   a power converter;
   at least one electric drive motor to be braked, said at least one electric drive motor being supplied by said power converter in motor operation and braked by said power converter in generator operation; and
   a redundant electric braking device having at least two braking stages and a circuit including a first switch, a second switch being actuated in at least two stages, at least one brake resistor, a comparator receiving a measured actual braking current and comparing the measured actual braking current to a desired braking current, and a control unit using said first switch for switching on said redundant electric braking device upon a failure of said power converter;
   said second switch being controlled to maintain a braking torque on an approximately constant level given a rotational speed of said electric drive motor.

2. The braking device according to claim 1, wherein said switches are transistors.

3. The braking device according to claim 1, wherein said switches are IGBTs.

4. The braking device according to claim 1, wherein at least said second switch is controlled by said control unit of said redundant braking system using pulse-width modulation.

5. The braking device according to claim 1, wherein said second switch is actuated by said control unit of said redundant braking system as a function of a current difference determined in said comparator.

6. The braking device according to claim 1, wherein said power converter has power components, said drive motor is a drive of a machine for processing printing material, said drive motor has a drive control, and said power components are switched off upon a failure of said drive control.

7. The braking device according to claim 6, wherein said control switches on said redundant braking device when an emergency stop signal is triggered for the machine for processing printing material.

8. A printing press, comprising:
   a braking device according to claim 1.

* * * * *

UNITED STATES PATENT AND TRADEMARK OFFICE
CERTIFICATE OF CORRECTION

PATENT NO. : 8,941,338 B2  
APPLICATION NO. : 13/315870  
DATED : January 27, 2015  
INVENTOR(S) : Reiner Villhauer et al.

Page 1 of 1

It is certified that error appears in the above-identified patent and that said Letters Patent is hereby corrected as shown below:

On the title page item (73), should read,  
Assignee: Heidelberger Druckmaschinen AG, Heidelberg (DE)

Signed and Sealed this  
Twelfth Day of May, 2015

Michelle K. Lee  
*Director of the United States Patent and Trademark Office*